Nov. 27, 1934.  A. WINTHER  1,982,461
ELECTRIC GOVERNOR
Filed Dec. 2, 1932  2 Sheets-Sheet 2
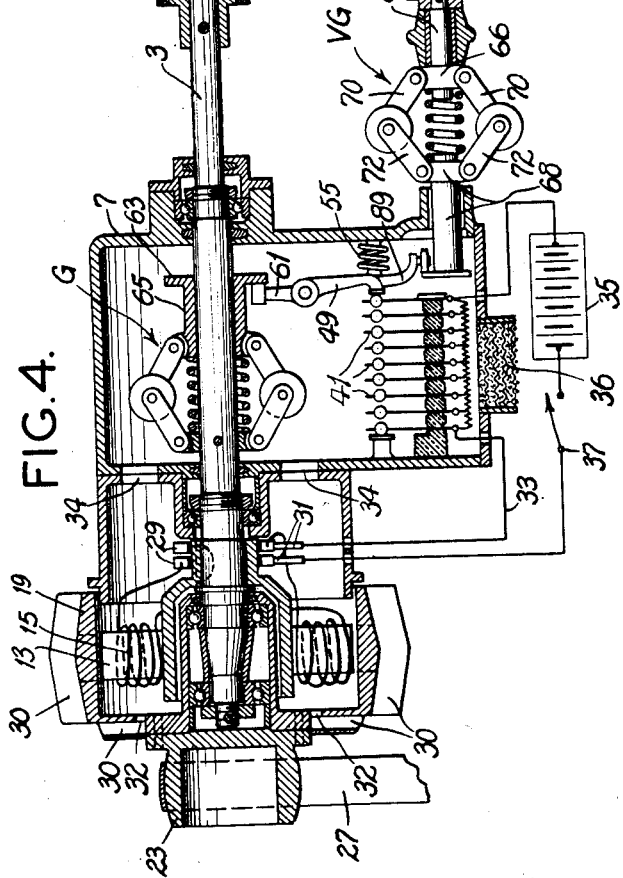
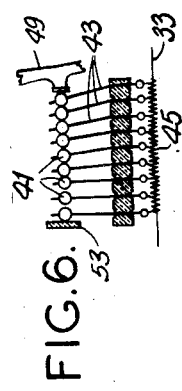
Inventor,
Anthony Winther
Delos G. Haynes
Attorney Patented Nov. 27, 1934

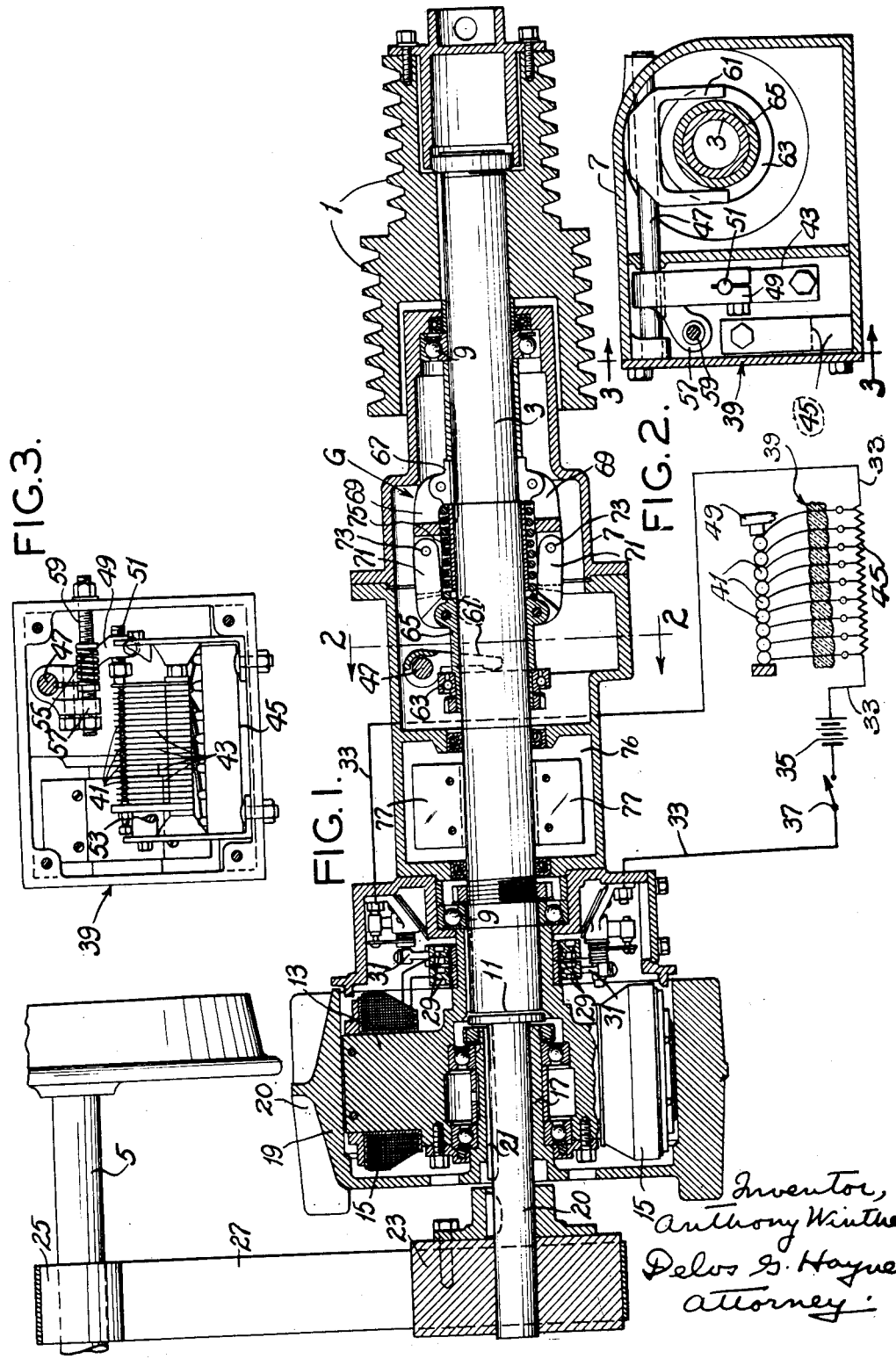

1,982,461

UNITED STATES PATENT OFFICE 1,982,461

ELECTRIC GOVERNOR

Anthony Winther, Kenosha, Wis.

Application December 2, 1932, Serial No. 645,407

8 Claims. (Cl. 242—75)

This invention relates to governors, and with regard to certain more specific features, to electric governors for speed control.

Among the several objects of the invention may be noted the provision of a simple but effective governor for maintaining the speed of a driven element substantially constant where the same is driven by a driver having a varying speed; the provision of apparatus of the class described in which the speed regulation is maintained within close limits and with a low degree of "hunting"; the provision of apparatus of this class wherein any small speed change which occurs, takes place smoothly and without sudden changes such as ordinarily occur where regulation is effected by means of a mechanism including a mechanical clutch; the provision of apparatus of this class in which the governing characteristics may be readily changed; and the provision of apparatus of the class described which is compact, which is dependable in operation, and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal section of one form of the device, diagrammatically shown as being connected with a variable speed axle of a railway car;

Fig. 2 is a cross section taken on line 2—2 of Fig. 1;

Fig. 3 is a cross section taken on line 3—3 of Fig. 2;

Fig. 4 is a longitudinal section showing another application of the invention;

Fig. 5 is a fragmentary end view of Fig. 4, taken from the right; and,

Fig. 6 is a diagrammatic view showing the operation of a resistance switch.

Similar reference characters indicate corresponding parts throughout the several views of the drawings.

Heretofore, when it has been desired to obtain a constant angular velocity of a driven element where the same has been driven from a driver having a varying angular velocity, centrifugal speed governing devices have been used, but many have included frictional means and mechanical clutch connections, all of which have introduced undesirable speed variations known as "hunting" and/or undesirable loss of energy. Others have introduced speed correcting factors operative at the starting velocities, thereby making it more difficult to properly correct for a constant speed at desired operating velocities. The present invention overcomes these and other difficulties of the prior methods and apparatus used.

Referring now more particularly to Fig. 1, there is shown at numeral 1 a grooved pulley mounted upon a shaft 3, which pulley 1 it is desired, for example, to drive from the axle 5 of a railway car or the like. The axle 5, as is known, has a widely varying angular velocity, whereas it is desirable that the pulley 1 having substantially a constant angular velocity, inasmuch as said pulley 1 is to be linked to machinery requiring such constant angular velocity, as for instance, the compressor of air conditioning apparatus of the car supported in part on the axle 5.

It is to be understood that the said application of the invention is exemplary and that it may be used in all analogous applications.

The shaft 3 which carries the driven pulley 1 is rotatably borne in a housing 7 by means of bearings 9. Said shaft ends at 11 where it carries keyed thereto a field spider member 13 carrying electro-magnetic field coils 15.

The field spider 13 rotatably supports gudgeon 17 of a steel inductor drum 19 which is keyed to shaft 20 by means of key 21. The drum 19 carries cooling fins 20. The shaft 20 carries a pulley 23 which is belted to a pulley 25 on the axle 5, the belt being shown at numeral 27.

A magnetic drive is thus provided without frictional contact between the driving and driven members.

The field spider 13 is thus driven from the axle 5, and, in order that said spider 13 may inductively be driven by the armature 19, the field coils 15 are energized by means of current brought in over suitable slip rings 29 electrically connected thereto. Lead-in brushes 31 introduce current to said slip rings 29 from an outside circuit 33, the latter being energized by a battery 35.

A manually operable switch 37 is used for starting and stopping operation and an automatic, resistance switch 39 (attached to said casing 7 as shown in Fig. 2, and detailed in Fig. 3) is wired into said circuit 33.

The resistance switch 39 comprises a plurality of silver or like contact heads 41 mounted on spring leaf supports 43, each of the latter comprising a tap from a resistance 45 (see also Fig.

6), the resistance 45 being serially arranged in said circuit 33. A rock shaft 47 carries a compressing arm 49 having an adjustable contact finger 51. The arm 49 is adapted to swing against the end switch contact 41 and upon clockwise movement to press the contacts 41 into engagement, one after the other, from right to left as shown in Fig. 6, and thus to gradually shunt out the resistance 45 as clockwise motion proceeds; and vice versa to cut in said resistance as counterclockwise motion occurs. An adjustable abutment 53 effects the necessary reaction of the endmost of the series of switch contacts 41. A spring 55 reacting between a bell crank extension 57 of said arms 49 and an adjustable abutment 59 serves to normally hold the arm 49 in a clockwise position wherein all of the contacts 41 are forced together, thus shunting out all of the resistance 45. The spring 55 and adjustable abutment 57 serve as an auxiliary governor adjusting means, permitting adjustment from a point outside of the governor per se. The purpose of the auxiliary adjustment is to effect governing at a speed which is a function of the average train speed, in order to permit operation at the highest average efficiency. Suppose, for example, a train A averages 40 M. P. H. The governor should therefore be set to maintain the slip at a minimum at 40 M. P. H. Should a car of this 40 M. P. H. train be switched to a faster train B, say averaging 51 M. P. H., the average efficiency would be reduced to 40/51 of that of train A. This adjustment abutment 59 permits effecting greater tension at the spring 55 so as to bring about an average minimum slip at 51 M. P. H. This adjustment may be made from the switch 39 without entering the governor housing. This shunted-out position is the normal position of the resistance switch 39 when the device is not operating, or operating below governor cut-in speed.

The rock shaft 47 passes from the switch 39 into the housing 7 (Fig. 2) and there is provided with a fork 61 which is engaged by a throw-out collar 63, the latter being mounted on a slip trunnion 65 carried on the shaft 3. Oppositely located with respect to the trunnion 65 is a fixed trunnion 67 keyed to said shaft 3.

The fixed trunnion 67 carries pivoted arms 69. The slip trunnion 65 carries pivoted arms 71. The arms 69 and 71 are pivoted together as at 73 and comprise centrifugal governor weights.

Normally the slip trunnion 65 is pressed away from the fixed trunnion 67 by means of a compression spring 75. Upon rotating the shaft 3, the centrifugal force of the arms or links 69, 71 tends to throw said arms outwardly to effect movement of the slip trunnion 65 toward the fixed trunnion to compress the governor spring 75. But as above noted, the normal shunted-out position of the switch 39 is maintained at standstill and for some time during which the device operates below governor cut-in speed. Hence it will be clear that the governing action is delayed due to what may be termed the preloading actions of springs 75 and/or 55 (Figs. 1 and 3).

The above action through the action of throwout collar 63 and cooperating fork 61 finally causes counterclockwise rotation of the rock shaft 47 and thus counterclockwise rotation of the arm 49 in the switch 39 (Fig. 3). This action takes place against the reaction of spring 55 in the switch 39 and causes a gradual serial opening of the contacts 41 and thus gradually throws into the circuit 33 fractions of the resistance 45. In view of the above, it will be seen that this action is delayed until the lower speed range has been passed through. Hence a strong magnetic field, unweakened by early corrections, is preserved for effecting definite and fast corrections at the desired speed.

The operation of the device is as follows:

The manual switch 37 is closed, whereby the field coils 15 are energized by means of current flowing from the battery 35 (or any other suitable source) over the circuit 33 and through the switch 39 and slip rings 29. If the armature 19 is not rotating, as when the axle 5 is stationary, the shaft 3 will be stationary and all of the switch contacts 41 will be closed, thus to short out all of resistance 45, preparatory to starting.

Thereafter, upon acceleration of the axle 5, the shaft 20 drives the armature 19 which inductively and by magnetic drag causes turning of the field spider 13. The field flux is at this time a maximum, because all of the resistance 45 is cut out. There should be a high flux concentration for low synchronous slip when operating over a very wide driving member speed variation. Thus very little slip occurs between the armature 19 and the field magnet member 13.

The result is that the shaft 3 is accelerated, as well as the driven pulley 1 and the parts belted thereto. As the shaft 3 accelerates the centrifugal governor, which I shall now designate as a whole by the letter G, after a predetermined speed is reached, draws the trunnion 65 to the right, thus rotating the rock shaft 47 counterclockwise and successively opening contacts of the series of contacts 41 and thus gradually cutting resistance into the circuit 33. The successive introduction of fractions of the resistance 45 into the circuit 33 gradually reduces the number of effective ampere turns of the coils 15, and thus the field strength (full up to this time) is reduced. This increases the magnetic slippage between the armature 19 and the field member 13 until the driving torque and resisting torque balance at the predetermined speed. Thus, the weights on the governor G may be arranged in view of the reaction springs 75 and 55, to effect a substantially predetermined speed of shaft 3.

When, as may be the case with variable loadings on the shaft 3, the tendency is for the speed of shaft 3 to reduce, the spring 75, in view of the reduced centrifugal force on the weights of the governor G, forces the trunnion 65 to the left and the rock shaft 47, in view of the reactions from spring 55, moves clockwise to press together more of the series of contacts 41 so as to cut out more of the resistance 45 and thus strengthen the field of member 13. This has the effect of reducing the magnetic slip between the spider 13 and armature 19, whereupon the speed of the shaft 3 is slightly increased or substantially maintained.

I prefer that the structure be arranged so that the making and breaking of the switch contacts 41 occurs midway of the series, thus leaving a number on the right which are positively closed and a number on the left which are positively opened and providing for ample resistance change for extreme conditions, either due to variations of speed of the drive shaft 20, and/or to variations of loading on the driven shaft 3.

When the switch 37 is opened, the field strength is reduced to zero and no driving will occur between the armature 19 and spider 15 at any speed of the driving elements.

Reference to Figs. 1 and 3 will show a compartment 76 in which are located fan blades 77 attached to said shaft 3. The compartment 76 is in communication with the housing of switch 39 (Fig. 3). These fan blades 77 serve to circulate air around the resistance 45 and to cool the same.

In Figs. 4 and 5 is shown another form of the invention in which like numerals designate like parts. In this modification, the belt 27 is not necessarily driven by a member having a variable angular velocity, but may be driven by a constant speed device, such as a constant speed electric motor. In this example, the driven shaft 3 has attached thereto a reeling spool 81 of a winding machine or the like. In machines of this class, it is desirable that the strip 83 which is being wound shall have a constant linear velocity.

The constant linear velocity is accomplished by providing a linear velocity governor VG on a shaft 85, the latter carrying a wheel or pulley 87 in contact with the strip 83. Thus the pulley 87 is caused to rotate at an angular speed according to the linear speed of the strip 83. The shaft 85 drives a stationary trunnion 66 and links 70 pivoted thereto, the links 70 being pivoted to links 72, the latter being attached to a movable slip trunnion 68. There is also provided an extension 89 from the arm 49, said extension being adapted to engage said slip trunnion 68.

It will be seen from the above that the angular velocity governor G will not permit the angular velocity of the reel 81 to exceed a predetermined value, for if the velocity increases, the arm 49 will be rotated counterclockwise to open some of the contacts 41 and introduce the resistance 45 so as to weaken the magnetic driving connection between armature 19 and spider 13.

As the strip 83 is drawn onto the reel 81, the angular velocity of the reel should decrease in order to maintain the linear velocity of the strip 83 constant. The linear velocity governor VG accomplishes this by causing the movable trunnion 68 to be drawn to the right upon any increase in speed of the linear velocity pulley 87.

Any tendency to increase the linear velocity of the strip 83 is of course caused by the increased wrapping radius on the reeling pulley 81 which, due to the governor G otherwise would have a constant angular velocity. As soon as the movable trunnion 68 is drawn to the right, the lever 49 is moved counterclockwise to have the effect of throwing in resistance and thus causing increased slip between armature 19 and spider 13 and thus reducing the speed of reeling pulley 81. The slowing down required by movement of the lower trunnion 68 is not interfered with by the governor G which, while it will predetermine the upper speed limit of spool 81, will not set a lower limit therefor, except in the absence of such limitation by governor VG.

The reeling mechanism also includes the usual auxiliary elements, such as a pressure roll 91 and a storage spool 93.

It will be understood that by disconnecting the pulley 87 and thus throwing governor VG out of operation, that a constant angular velocity would be maintained for the spool 81, but that there would be no limitation to the linear velocity of the strip.

On the other hand, the governor G could be disconnected, leaving the governor VG connected, thereby predetermining the linear velocity of the strip 83 without predetermining any maximum angular velocity of the spool 81.

The elimination of the action of either of the governors may be effected by substituting for the arm 49 a suitable lever without connection to the slip trunnion 63 or 68 of the respective governor involved.

At Fig. 4 I have shown the ventilating system as comprising an integral part of the elements of the device. The armature 19 has radial and lateral radiations fins 30 thereon for also drawing air through openings 32 and openings 34 connecting the electrical compartments with the compartment in which the switch 39 is located. Thus air is drawn through the said compartments, the same entering by way of a filter 36 adjacent to the switch 39. Hence clean air is introduced and the resistance suitably cooled, as well as are the remaining parts of the apparatus.

Among the advantages of the invention may be noted the provision of a large selection of driven velocities available by adjusting the governor weights and/or springs, as well as the spring 55 in the switch 39.

The substitution for a mechanical clutch of the electro-dynamic clutch, the electro-dynamic clutch being controlled to slip according to centrifugally controlled resistance results in exceedingly smooth operation.

Besides varying the weights and springs of the centrifugal governor, values of the fractional resistances of the resistance 45 can be varied and the number of these resistances used may be increased or decreased to suit any desired result. For instance, I have used twenty-one sections of resistance on a ten horsepower machine set to govern a shaft such as shaft 3 operating at 800 R. P. M. By a proper selection of resistance sections, the regulation of such shaft 3 was brought to within one per cent of that desired, although a load variation was encountered from fifty (50) to one hundred and twenty-five (125) per cent while the driving pulley varied from 900 R. P. M. to 2000 R. P. M.

Furthermore, there is an infinite number of available selections of resistance, which may be worked out requiring only a slight movement of the centrifugal actuating governors VG for great resistance change, thus providing great sensitivity.

Another feature is that values of the centrifugal governor weights and springs may be chosen to give complete opening and closing of the resistance contactors with only slight change in the revolutions of the shaft 3.

The resistance switch is dependable, because, as indicated in Fig. 6, there is a sliding or wiping action between the contacts when they are in operation. This sliding action is slight from the viewpoint of wear but is sufficient to maintain clean points of contact.

Another feature of the variable resistance switch is that, unlike carbon piles and the like, it can be arranged to give any desired current curve with a given movement of the contact actuating lever 49. This is accomplished by choice of values between contact leaves 43. For constant service, such as is met with at the contact leaves most constantly in use while a given machine is operating, it is desirable to hold the watt loss to from three (3) to six (6) watts per pair of contacts. For intermittent service such as the resistances last opened, to prevent the machine from overspeeding when unloaded, the watt loss per set of contacts can be increased without trouble from heating contacts.

From the above it will be seen that I have provided an electric speed governor having an electro-magnetic clutch, the driving element of which is an inductor and the driven element of which carries a field magnet magnetically co-operating with said inductor, the magnet being controlled in speed by a centrifugal governing device which affects a resistance for controlling the magnetic flux intensity where the inductive cooperation takes place. Or, the device comprises an electro-magnetic clutch comprising an electrically excited driven field member and a driving, inductive armature, in combination with a centrifugally actuated resistance bank for controlling the field, centrifugal action being obtained from the driven member.

It is of importance to have the field coils, rings and brushes therefor on the driven member, because this member is operating at constant speed and brushes and their contacts can therefore be designed for this speed. If these elements were on the driving member, this advantageous feature of design could not be had. Moreover, as the slip increases between the driving and driven members the eddy currents in the inductor 19 increase with consequent increase in the heat generated. Therefore it is desirable that the inductor be the driving member so that an increase in heat generated will be accompanied by increased angular velocity of the cooling fins 30.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, a driving member, a driven member, means driven by said driven member adapted to wind a strip, a magnetic field connection between said members, means for energizing said field including a resistance, centrifugal means responsive to speed change of said driven member adapted to cut in said resistance with increase of speed, and a second means responsive to the linear speed of said strip, speed responsive means driven by said second means and also controlling said resistance to increase the same as the speed of said second means increases, whereby the driven member is reduced in speed as the winding advances to maintain a constant linear velocity of said strip.

2. In apparatus of the class described, a driving inductor, a driven field member, field windings on the driven member, means driven by said driven member adapted to wind a strip, an electric circuit for energizing said windings to effect a magnetic connection between the field member and the inductor, a resistance in said circuit, a shunt for said resistance, means for operating the shunt to cut in and out of said resistance, centrifugal means responsive to speed change of said field member adapted gradually to cut in said resistance by cutting out said shunt with increase of speed, and a second means rotatably responsive to the linear speed of said strip, speed responsive means driven by said second means and also controlling said resistance to increase the same as the speed of said second means increases, whereby the driven member is reduced in speed as the winding advances to maintain a constant linear velocity of said strip.

3. In apparatus of the class described, a non-friction magnetic drive comprising a driving armature and a driven field member, variable speed means for driving said armature, a circuit for energizing said field member, means for electrically energizing said circuit, resistance in said circuit having serial components, shunt means in parallel with said resistance comprising a series of spaced contacts, movable supports for respective pairs of contacts, adjacent supports being connected to opposite ends of respective resistance components, said supports providing components of movement for the contacts which are normal to the contact surfaces where they touch and means responsive to speed of the field member adapted to consecutively press together said contacts to proportionately shunt said resistance components as speed of the driven member decreases, said resistance being shunted out at a speed of the driven member substantially greater than at standstill.

4. In apparatus of the class described, a non-friction magnetic drive comprising a driving armature and a driven field member, variable speed means for driving said armature, a circuit for energizing said field member, means for electrically energizing said circuit, resistance in said circuit having serial components, shunt means in parallel with said resistance comprising a series of spaced contacts, movable supports for the respective contacts, adjacent supports being connected to opposite ends of the respective resistance components, said supports providing components of movement for the contacts which are normal to the contact surfaces where they touch and means responsive to speed decrease of the field member adapted to consecutively press together said contacts to proportionately shunt said resistance components as speed decreases, said contact supports comprising spring members so arranged that as the contacts move into contact, a wiping action is effected therebetween, said resistance being shunted out at a speed of the driven member substantially greater than at standstill.

5. In apparatus of the class described a non-friction magnetic drive comprising a driving and a driven magnetic field member, an electric circuit for energizing the magnetic field, a resistance in said circuit, means responsive to motion of the driven element adapted to change said resistance, said resistance comprising a plurality of resistance components, a plurality of leaf springs respectively electrically connected between components, contacts carried by the springs which by contact between pairs shunt the respective resistance components, said contacts being normally spaced from one another, and means connecting the speed responsive means with the last of the contacts whereby the contacts may be serially moved toward one another and together by movement of the end contact, said resistance being all shunted out over a relatively wide speed range starting from standstill but being adapted to all be proportionally placed in circuit over a relatively narrow speed range.

6. In apparatus of the class described, a non-friction magnetic drive comprising a driving and a driven magnetic field member, an electric circuit for energizing the magnetic field, a resistance in said circuit, means responsive to motion of the driven element adapted to change said resistance, said resistance comprising a plurality of resistance components, a plurality of leaf springs respectively electrically connected between components, contacts carried by the springs and by pairs shunting the resistance components, said contacts being normally spaced from one another, means connecting the speed responsive means with the last of the contacts whereby the contacts may be serially moved toward one another and together by movement of the end contact, said resistance being shunted out at predetermined low speeds over a substantial range, so as to completely shunt all of the resistance components and preserve maximum field energization throughout said range.

7. In apparatus of the class described, a non-friction magnetic drive comprising a driving element operable at variable speeds and a driven magnetic field member, an electric circuit for energizing said magnetic field member, a resistance in said circuit comprising a plurality of resistance components, governing means responsive to motion of the driven element, sectional shunt contacts around the respective resistance components, said governing means successively controlling the shunt means whereby the resistance is shunted in and out according to increase or decrease in speed of the driven element, said resistance being shunted out over a substantial range of lower speeds and thereby preserving a maximum field strength over said range and obtaining a sensitive speed correction over a relatively short higher speed range.

8. In apparatus of the class described, a non-friction magnetic drive comprising a driving element operable at variable speeds and a driven magnetic field member, an electric circuit for energizing said magnetic field member, a resistance in said circuit comprising a plurality of resistance components, governing means responsive to motion of the driven element, sectional shunt contacts around the respective resistance components, said governing means successively controlling the shunt means whereby the resistance is shunted in and out according to increase or decrease in speed of the driven element, said resistance being shunted out over a substantial range of lower speeds and thereby preserving a maximum field strength over said range and obtaining a sensitive speed correction over a relatively short higher speed range, the ratio of speed change in said upper range to that in said lower range being of the order of a few percent.

ANTHONY WINTHER.